United States Patent
Weng et al.

(10) Patent No.: US 12,252,231 B2
(45) Date of Patent: Mar. 18, 2025

(54) AIRCRAFT CABIN SECTION AND AIRCRAFT HAVING AN AIRCRAFT CABIN SECTION

(71) Applicant: Airbus Operations GmbH, Hamburg (DE)

(72) Inventors: Alexander Weng, Hamburg (DE); Hauke Kirstein, Hamburg (DE); Sven Teichmann, Hamburg (DE); Viktor Gribele, Hamburg (DE); Marc-Julien Ettori, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 254 days.

(21) Appl. No.: 17/847,493

(22) Filed: Jun. 23, 2022

(65) Prior Publication Data

US 2022/0411068 A1 Dec. 29, 2022

(30) Foreign Application Priority Data

Jun. 25, 2021 (EP) .................................... 21181828

(51) Int. Cl.
*B64C 1/14* (2006.01)
*B64D 25/08* (2006.01)
*B64D 25/14* (2006.01)

(52) U.S. Cl.
CPC .......... *B64C 1/1461* (2013.01); *B64C 1/1407* (2013.01); *B64D 25/08* (2013.01); *B64D 25/14* (2013.01)

(58) Field of Classification Search
CPC ...... B64C 1/1423; B64C 1/143; B64C 1/1461
See application file for complete search history.

(56) References Cited

U.S. PATENT DOCUMENTS

| | | | | |
|---|---|---|---|---|
| 4,199,120 A * | 4/1980 | Bergman | ................ | B64C 1/143 244/129.5 |
| 5,106,036 A * | 4/1992 | Sepstrup | ................ | B64D 25/14 244/905 |
| 5,586,615 A * | 12/1996 | Hammer | ................ | B64D 25/14 244/137.2 |
| 5,738,303 A * | 4/1998 | Hamatani | ............... | B64D 25/14 244/905 |
| 6,457,677 B2 * | 10/2002 | Dazet | ..................... | B64D 25/14 244/905 |
| 9,617,783 B2 * | 4/2017 | Yahata | ................... | B64C 1/1407 |
| 11,203,405 B2 * | 12/2021 | Casse | .................... | B64C 1/1461 |
| 2014/0103163 A1 * | 4/2014 | Lamat | ................... | B64C 1/1461 244/129.5 |

* cited by examiner

*Primary Examiner* — Richard Green
(74) *Attorney, Agent, or Firm* — Greer, Burns & Crain, Ltd.

(57) ABSTRACT

An aircraft cabin section with an aircraft door, a cabin floor, and at least one lining mounted to the aircraft door. The aircraft cabin section further comprises at least one seal that is mounted to the at least one lining and seals a space between the at least one lining and the cabin floor. This prevents a cold air draft from entering the aircraft cabin.

19 Claims, 6 Drawing Sheets

FIG 5
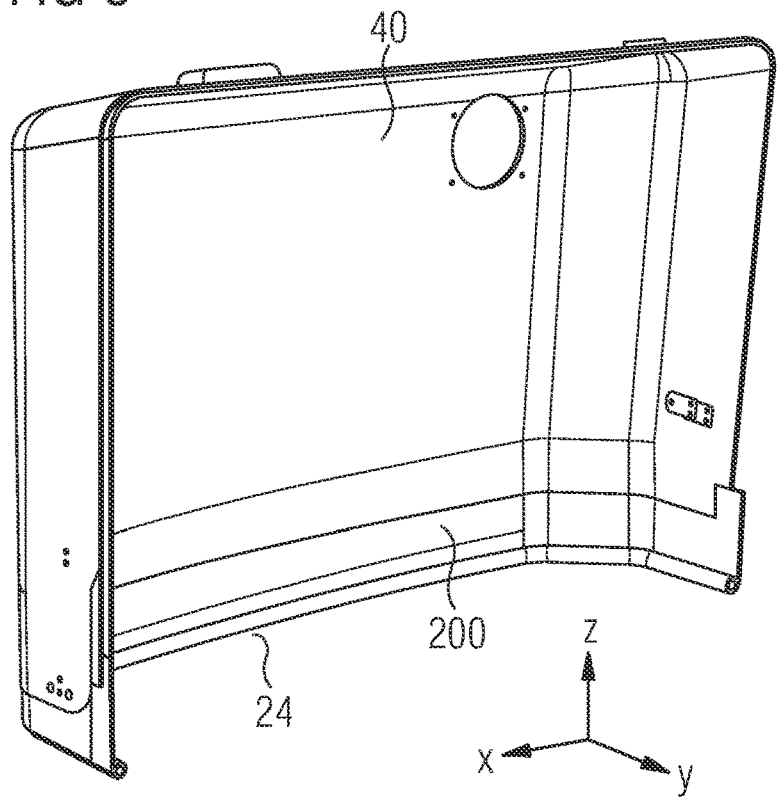
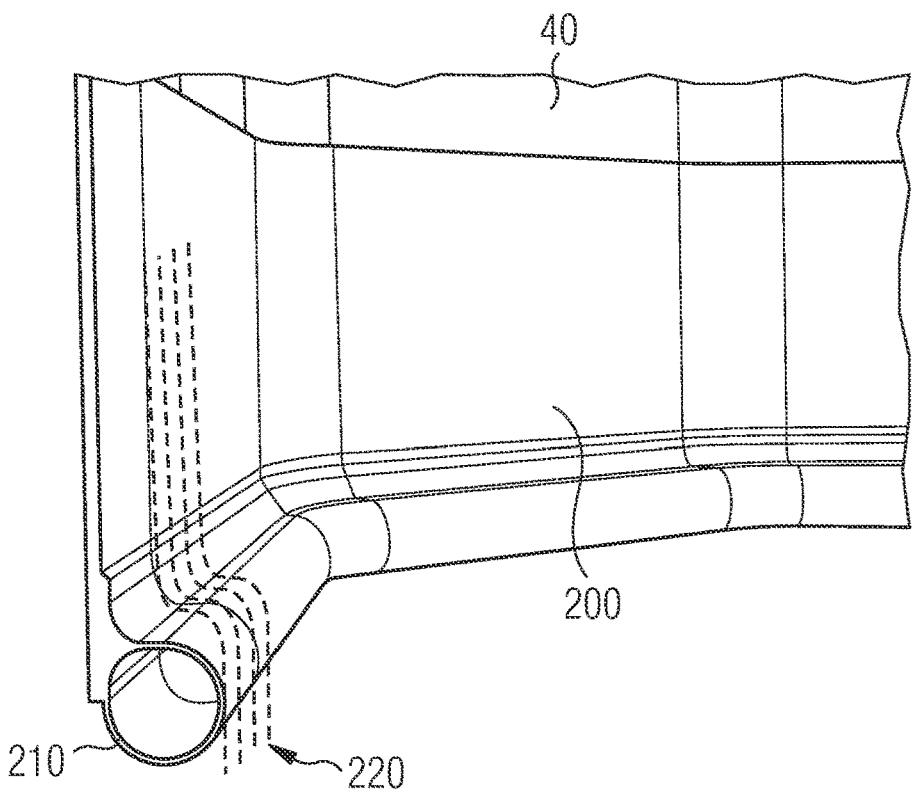

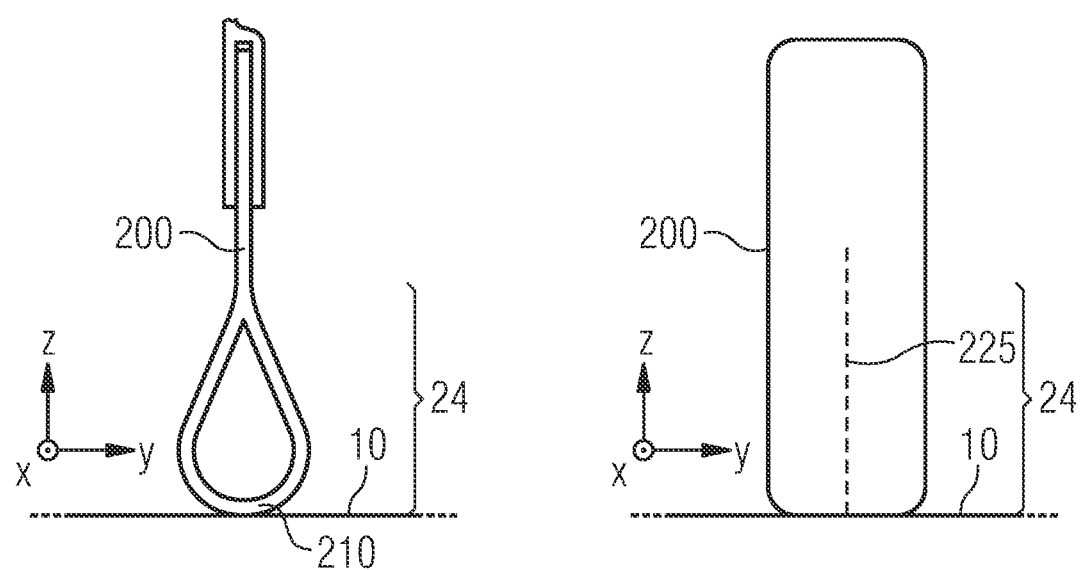

AIRCRAFT CABIN SECTION AND AIRCRAFT HAVING AN AIRCRAFT CABIN SECTION

CROSS-REFERENCES TO RELATED APPLICATIONS

This application claims the benefit of the European patent application No. 21181828.1 filed on Jun. 25, 2021, the entire disclosures of which are incorporated herein by way of reference.

FIELD OF THE INVENTION

The present invention is directed to an aircraft cabin section with an improved seal against cold air and an aircraft having such aircraft cabin section. Particularly, the present invention is directed to an aircraft cabin section with at least one seal sealing a space between at least one door lining and a cabin floor, and an aircraft having at least one such aircraft cabin section.

BACKGROUND OF THE INVENTION

Since an aircraft door closes an opening in the outer skin of an aircraft, the aircraft cabin section in the vicinity of the door is often subject to a reduced temperature or even cold air draft. Particularly, the insulation of the aircraft skin is interrupted due to the aircraft door and a continuous insulation cannot be provided at an outer circumference of the door and the door frame forming the opening through the aircraft skin.

Most of the operators of aircraft (e.g., airlines) want greater flexibility in usage of a particular aircraft, for example, to perform short and long haul flights. However, long haul flights usually take place at greater heights, so that the aircraft is exposed to colder air for a longer time than on short haul flights. As smaller aircraft were initially designed for short haul flights, the insulation against cold ambient air at a door of the aircraft was designed for lower heights and shorter exposure durations.

In any case, due to the colder temperature in the vicinity of the door, where a galley or other operating space for flight attendants is often located, some flight attendants put a blanket or other fabric in the gap between the door and the door frame and/or cabin floor. This may have blocked the cold air from entering the aircraft cabin. However, it may also form a hazard in case of an emergency or in case the blanket or fabric was moved and formed an obstacle for the working flight attendant.

SUMMARY OF THE INVENTION

The present invention, hence, is directed to an object of enhancing comfort in an aircraft cabin section and aircraft.

According to a first aspect providing a better understanding of the present disclosure, an aircraft cabin section comprises an aircraft door, a cabin floor, and at least one lining mounted to the aircraft door. The aircraft door is arranged at an outer skin of the aircraft and is configured to be moved between an open position and a closed position. The door clears and blocks an opening in the outer skin of the aircraft, when the door is in the open and closed position, respectively. For example, passengers can enter and leave the aircraft through this opening or goods can be moved in and out.

In addition, an aisle may lead from the door to a center of the aircraft cabin. Usually, at least one flight attendant seat and/or a galley is arranged at this aisle. The aircraft door may also be an emergency door, which is usually arranged next to passenger seats, for example, above a wing of the aircraft.

The at least one lining is an interior component, i.e., a component arranged at an interior side of a door leaf. The door leaf is to be understood as forming a portion of the outer skin of the aircraft arranged in the opening in the outer skin, when the door is in the closed position. The at least one lining may be at least partly visible from inside the aircraft cabin. Alternatively, the at least one lining may be at least partly covered by other components mounted to the door and/or, when the door is in the closed position, by components mounted in the vicinity of the door, such as at a door frame. For instance, the lining can cover the door leaf and/or an insulation provided on an interior side of the door leaf. Thus, the door leaf and lining (and optionally an insulation) form the aircraft door that closes the opening in the outer skin of the aircraft. Of course, the lining can also be understood as forming part of the door leaf and is arranged on an interior side of the aircraft door.

Furthermore, the aircraft cabin section further comprises at least one seal that is arranged at (i.e., mounted to or connected to) the at least one lining and seals a space between the at least one lining and the cabin floor. The seal can be formed from a single piece to avoid any unnecessary openings degrading its sealing capabilities. Such seal improves the overall insulation capabilities of the aircraft door, since it has been found that during flight the lowest temperature develops in a lower region of the aircraft door (near the door sill). Due to the interruption of the insulation of the aircraft at a circumference of the door leaf, a temperature drop in this circumferential region can be measured. The at least one seal arranged at the cabin floor, particularly, blocks a cold air draft that usually develops in the lower region of a conventional aircraft door and flows through the aisle towards the center of the aircraft cabin. The seal can, therefore, act as a draft defender with respect to the aircraft cabin and can be configured to guide the cold air towards a compartment below the cabin floor, such as a freight or luggage compartment. As people often stay in this area of the aircraft cabin, particularly flight attendants operating in the galley arranged in the aisle or passengers sitting near the aisle, the at least one seal enhances comfort.

In an implementation variant, the at least one seal can be configured to elastically deform when contacting the cabin floor. For instance, the at least one seal may elastically deform in response to a movement of the aircraft door relative to the cabin floor. This allows moving the door from its open position to its closed position, while a gap between the aircraft door and the cabin floor is blocked by the at least one seal even if the door still moves into the closed position. For example, usually an aircraft door swings into the opening in the outer skin and is then lowered, so that a plurality of latches may lock the door in the door frame. The elasticity of the at least one seal allows both movements of the door, while closing the gap to the cabin floor. Moreover, the elasticity of the at least one seal further allows closing the gap even if the door sill and/or cabin floor has uneven portions, such as grooves arranged in the entrance region of the cabin floor.

Furthermore, the at least one lining may be sized and arranged, so that a rim of the at least one lining is in a circumferential region of the door leaf. The at least one seal can be arranged at the outer rim of the at least one lining or can be integrated to the at least one lining Thus, the at least one seal may form an extension of the lining, but provides sufficient flexibility to close a gap between the aircraft door, particularly the lining, and the cabin floor, during closing of the aircraft door and when the aircraft door is in the closed position.

In the following reference is made to a cross-section or cross-sectional direction of the at least one seal as well as a longitudinal direction of the at least one seal. As the at least one seal is arranged to close a gap between the aircraft door and the cabin floor, the longitudinal direction means a direction along the gap. For instance, the gap may run along a rim of the lining closest to the cabin floor. Thus, the longitudinal direction of the at least one seal is along the rim of the lining. Of course, the rim and, hence, the longitudinal direction may include bends or another curvature, if the lining does not follow a straight line. The cross-sectional direction or cross-section is perpendicular to the longitudinal direction.

In a further implementation variant, the at least one seal can comprise at least one flat section that is arranged substantially perpendicular to the cabin floor. This flat section contributes mainly to the blocking of cold air from the aircraft door that would otherwise enter the aircraft cabin. It is to be understood that the flat section does not need to be entirely flat and arranged in a plane. Rather, the flat section may also be curved in a longitudinal direction of the at least one seal (e.g., to follow a curvature of the door or lining) In addition, the flat section may be substantially flat when the door is in the open position, but may be curved (bent) in a cross-section when the door is in the closed position and the at least one seal contacts the cabin floor. In any case, the at least one seal being flat means that a dimension of the at least one seal in the cross-sectional direction is smaller than the dimensions in a plane parallel to or along the longitudinal direction of the at least one seal.

In another implementation variant, the at least one seal can comprise a bent section that forms a free end of the seal arranged to contact the cabin floor, when the aircraft door is in a closed position. The bent free end of the at least one seal is bent when viewed in a cross-section of the at least one seal. For instance, the at least one seal can have a flat section which ends in the bent free end. The bent section of the at least one seal may be bent even if the door is in an open position and the at least one seal does not contact the cabin floor. This facilitates sliding of the free end of the seal on the cabin floor during the closing movement of the door and ensures proper sealing of the gap between the aircraft door and the cabin floor. For instance, the bent section may be bent towards the door leaf, i.e., may be bent towards an exterior of the aircraft cabin, or may be bent away from the door leaf, i.e., may be bent towards an interior of the aircraft cabin.

In yet another implementation variant, the at least one seal can comprise a loop section that forms a free end of the seal arranged to contact the cabin floor when the aircraft door is in a closed position. The loop section facilitates elasticity of the at least one seal and allows easier movement on the cabin floor during closing and opening of the door.

The at least one seal, for example, may be provided with a loop section as well as a bent section and optionally a flat section. For instance, along a longitudinal direction of the at least one seal a bent section may be followed by a loop section and vice versa, so that particular portions of the at least one seal have a higher flexibility (at the bent section) while other portions of the at least one seal are stiffer (at the loop section). Thus, the at least one seal can be adapted to the circumstances of the door, the lining, the cabin floor and/or the gap between door and cabin floor.

In an implementation variant, the at least one seal can have one or more slits. The one or more slits may have a straight form, may be curved and/or may have branches. In addition, the slit may be arranged completely in the at least one seal, so that the slit has at least two closed ends. In other words, the slit forms a through hole in the at least one seal. Alternatively, the slit may begin at a free end of the at least one seal, so that the at least one seal is at least partly subdivided along the longitudinal direction.

Furthermore, in a further implementation variant, the one or more slits is/are arranged parallel to a cross-section of the at least one seal and/or parallel to a longitudinal direction of the at least one seal. A slit parallel to a cross-section (i.e., cutting the seal in its cross-section) can either form a through hole or, if it is also disposed at a free end of the at least one seal, subdivides the at least one seal at least partly in the longitudinal direction. A slit parallel to the longitudinal direction of the at least one seal (i.e., cutting the seal in its longitudinal direction) achieves two free ends of the at least one seal arranged next to each other in the cross-sectional direction. In any case, the one or more slits increases flexibility of the at least one seal, which facilitates the closing of the gap between the door and the cabin floor, since the at least one seal can better adapt to the form and dimensions of the gap.

A plurality of slits can be provided parallel to a cross-section of the at least one seal. This also increases flexibility of the at least one seal in the longitudinal direction thereof, since the portions of the at least one seal between two slits can move freely from the remainder of the at least one seal. In other words, the at least one seal has the shape of a comb or brush with flexible bristles. These flexible bristles can move in the cross-sectional direction as well as the longitudinal direction of the at least one seal and, hence, are particularly advantageous in an area of the lining that is arranged at an angle to a plane of the aircraft door, i.e. a plane of the door leaf or opening in the aircraft outer skin, when the door closes or is in the closed position.

In yet a further implementation variant, the at least one seal can be configured to contact a lining of a door frame, i.e., a lining arranged next to the aircraft door. For instance, the at least one seal may have at least a section that is arranged in a gap between a side of the aircraft door and a side of the lining of the door frame. Thus, the at least one seal may have at least a section that extends above the cabin floor along the rim of the door.

In another implementation variant, the at least one lining can be a door lining and/or a slide cover covering an emergency escape slide attached to the aircraft door. The slide cover may be provided in addition to a door lining in the lower region of the aircraft door or instead of a door lining Usually, the slide cover has a shape with a larger dimension towards the interior of the aircraft cabin than a normal door lining, so that the slide cover forms a storage space for the folded emergency escape slide.

For instance, the majority of aircraft doors are equipped with an emergency escape slide that has to be disposed in the lower region of the door. Regulations regarding such emergency escape slides require access to and/or visibility of the lower regions of the emergency escape slide, i.e., the lower regions of the slide cover and the door, at least during taxi, take-off and landing of the aircraft. For instance, there may be slide indicators or operating handles in these regions that require to be accessible and/or visible. Thus, conventional aircraft doors have a large gap between the door leaf and the cabin floor. Particularly, the corner regions of the aircraft door and slide cover near the door sill are open and, hence, allow cold air to enter the aircraft cabin.

According to the implementation variant of the disclosed aircraft cabin section, at least one seal is arranged between the slide cover and the cabin floor. The at least one seal can, particularly, be arranged at an interior rim or edge of the slide cover.

In yet another implementation variant, the at least one seal can be configured to allow protruding of an indicator and/or handle of the emergency escape slide through the at least one seal and to seal at least part of a circumference of the indicator and/or handle. For instance, particularly in a corner region of the aircraft door there is usually arranged an indicator of the emergency escape slide indicating whether the slide is armed or disarmed. This means whether a grit bar of the slide is hooked to the cabin floor and/or door sill, so that the slide is connected to the cabin floor in case of an emergency and when the door has been opened and the slide will be inflated. Moreover, in addition to the indicator or integrated therein can be a handle for releasing the emergency escape slide from the grit bar, for example, if the slide is to be used as a floating raft.

In any case, such indicator and/or handle has to be visible and accessible. Thus, the at least one seal is provided, for example, with a through hole and/or slit through which the indicator or handle can protrude. The through hole and/or slit can be sized to allow the indicator and/or handle to pass through during movement of the aircraft door and, hence, the movement of the at least one seal, while the at least one seal is in contact with a circumference of the indicator and/or handle. This facilitates insulation of the aircraft door and, at the same time, fulfils the requirements of accessibility and visibility of the indicator and/or handle.

In a particular implementation variant, the through hole through the at least one seal can be formed by one slit having two closed ends, i.e., forming a through hole. Alternatively, the slit may have branches and, hence, has more than two closed ends, so that a plurality of flaps is formed in the at least one seal, wherein the flaps contact the circumference of the indicator and/or handle. The branched slits may have a symmetric arrangement, for example, having a shape comparable to a star or snowflake. Alternatively, the branched slits may be arranged and sized in accordance with a form of the indicator and/or handle. This includes branched slits having one or more connecting points, i.e., location/s where the slits meet and form corners of the associated flaps.

In another implementation variant, the at least one seal can be made of an elastic material. Such elastic material can be rubber or silicone. Such materials allow the provision of long lasting seals, which can be used during a plurality of opening and closing movements of the aircraft door.

According to a second aspect providing a better understanding of the present disclosure, an aircraft has at least one aircraft cabin section according to the first aspect or an implementation variant or a combination of implementation variants thereof.

It is to be understood that the above-described aspects and implementation variants can be combined, without explicit description of such combinations. Particularly, each described implementation variant is optional to each of the other implementation variants or already combinations thereof. The order of the described implementation variants does not limit the way the implementation variants can be combined with one another.

BRIEF DESCRIPTION OF THE DRAWINGS

Preferred examples of the invention are described in view of the enclosed drawings, wherein:

FIG. 5 schematically illustrates another example of a seal; and

FIG. 6 schematically illustrates variants of an exemplary seal.

DETAILED DESCRIPTION OF THE PREFERRED EMBODIMENTS

Figure 1:
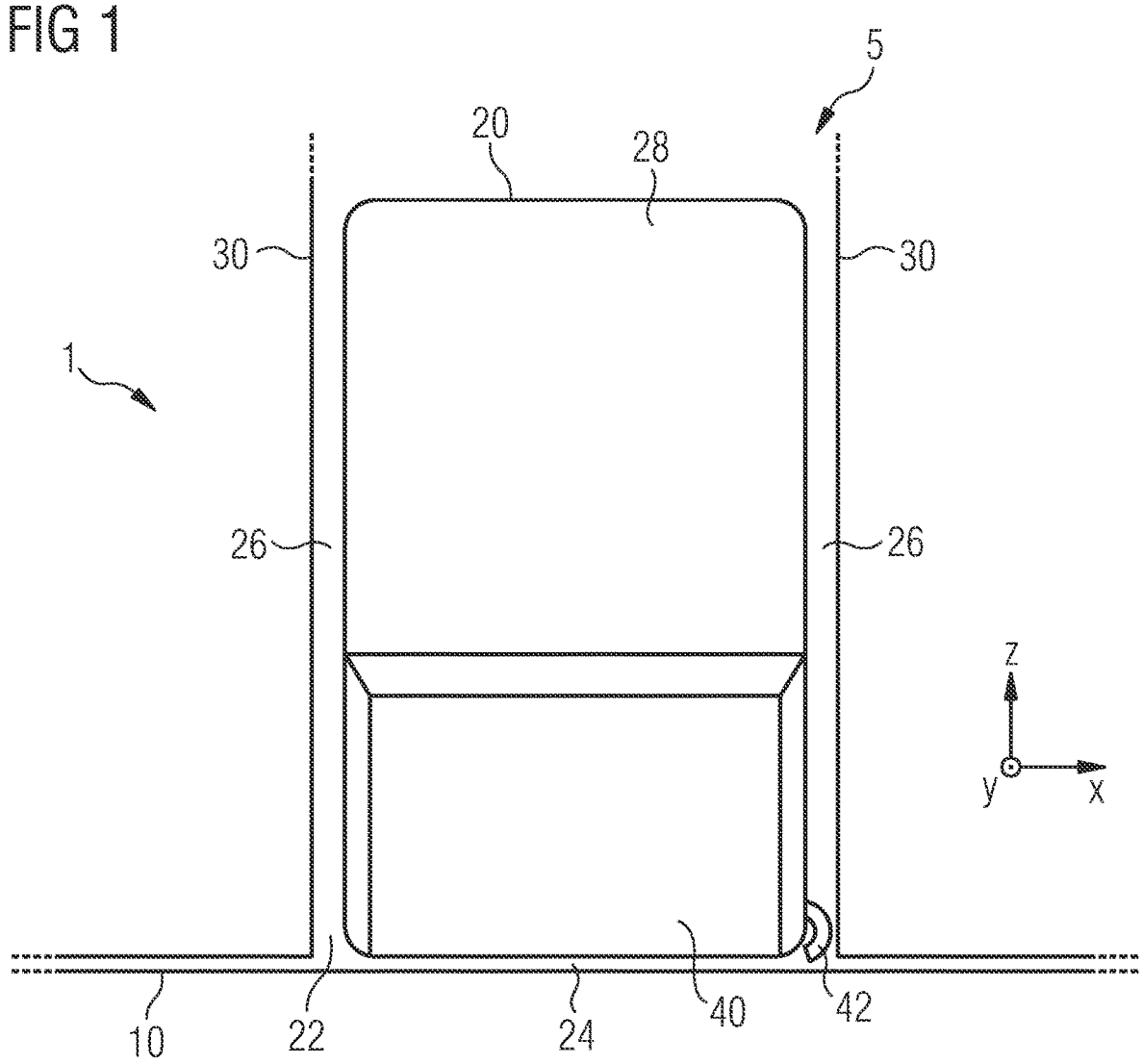
FIG. 1 schematically illustrates an aircraft cabin section at an aircraft door.

FIG. 1 schematically illustrates an aircraft cabin section 5 in a region of an aircraft 1 having an aircraft door 20 and a cabin floor 10. The aircraft cabin section 5 is shown in FIG. 1 from an interior side of the aircraft cabin. The aircraft door 20 can be covered on an interior side thereof by a door lining 28. Such door lining 28 may form an interior appearance of the aircraft door 20 and, particularly, covers any components and/or insulation of the aircraft door 20 that should not be visible or accessible. Next to the aircraft door 20 are arranged wall linings 30 forming an interior appearance of the aircraft cabin at a door frame and cabin wall.

Furthermore, the aircraft door 20 may be equipped with an emergency escape slide (not visible) that is covered by a slide cover 40. When the aircraft door 20 moves from a closed position as shown in FIG. 1, to an open position, the emergency escape slide and slide cover 40 moves together with the door 20, as both is mounted to an interior side of the door 20. The door lining 28 may be provided in a region of the door 20 covered by the slide cover 40, which allows implementing the same door 20 in aircraft with or without an emergency escape slide attached to the door 20. Alternatively, the door lining 28 ends at the upper edge of the slide cover 40.

While the door 20 closes an opening in the outer skin (not illustrated) of the aircraft 1, there is usually a gap 26 between the door lining 28 and each of the wall linings 30, as well as a gap 24 between the door lining 28 or slide cover 40 and the cabin floor 10. Bottom corners 22 of such gaps may even be larger. These gaps 22, 24, 26 are necessary to allow movement of the aircraft door 20 between an open position and a closed position (the latter being shown in FIG. 1).

Furthermore, there may be an indicator or handle 42 of the emergency escape slide in a corner 22 of the aircraft door 20 close to the cabin floor 10. This also requires a large gap 22 between the interior of the aircraft door 20 (such as door lining 28 or slide cover 40) and the wall linings 30 and cabin floor 10.

These gaps 22, 24, 26 are closed by at least one seal 100, 200 as illustrated in and described with respect to FIGS. 2 to 6.

Figure 2:
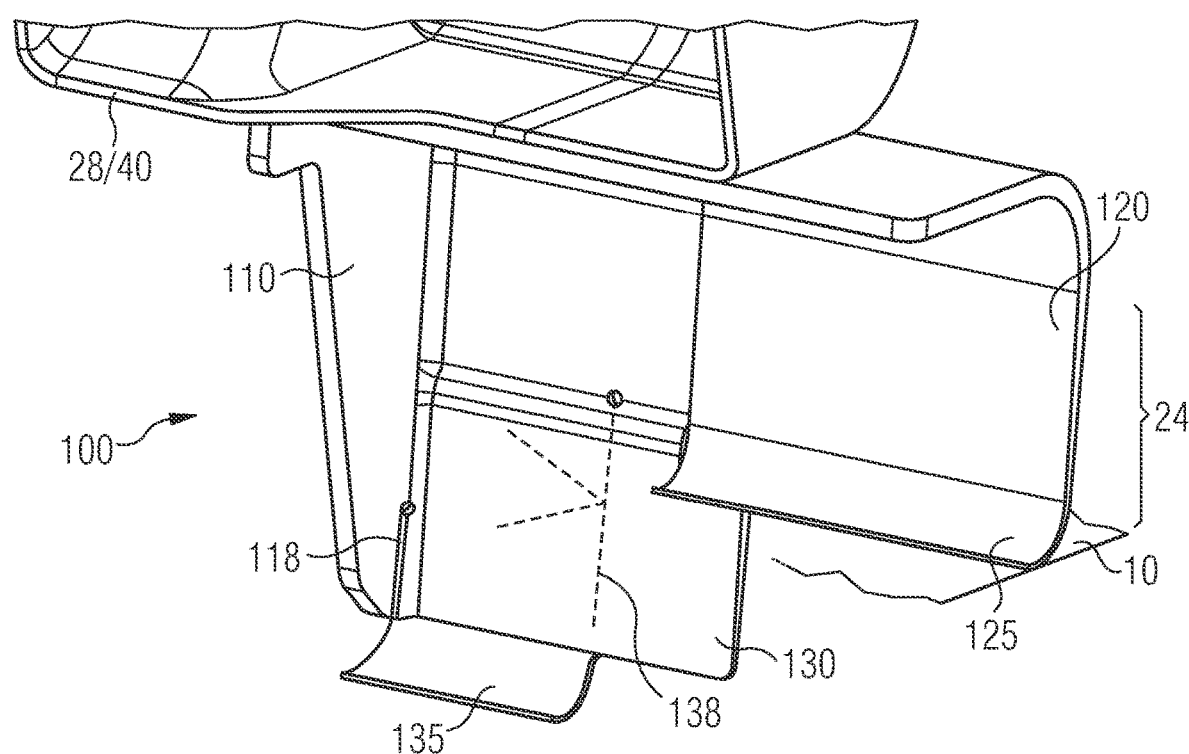
FIGS. 2 to 4 schematically illustrate exemplary seals.

For instance, FIG. 2 illustrates an exemplary seal 100, that can be arranged in a corner 22 in a lower region of the aircraft door 20, i.e., near a door sill. The seal 100 illustrated in FIG. 2 is viewed from the outside towards the inside of the aircraft cabin to facilitate explanation of the various features of the seal 100. The seal 100 can be mounted to or integrated into the door lining 28 or the slide cover 40, particularly at a bottom edge or rim thereof, which is partly shown in FIG. 2.

Seal 100 may comprise at least one flat section 110, 120, 130, which spans between the bottom edge of door lining 28 or slide cover 40 and cabin floor 10 (only a small portion is illustrated in FIG. 2). Such flat section 110, 120, 130 closes the gap 22, 24 (and optionally also a portion of gap 26) and blocks any cold air draft from entering the aircraft cabin. The at least one flat section 110, 120, 130 of the seal 100 may be arranged along a longitudinal direction of the seal 100. As can be derived from FIG. 2, the longitudinal direction may be curved or may have bends, so that one flat section 110 is arranged at an angle with respect to another flat section 120, 130 of the same seal 100. The angle may correspond to or may depend on a course of the bottom edge or bottom rim of the door lining 28 or slide cover 40, to which the seal 100 is mounted.

In order to provide proper closure of the gap 22, 24, 26, the seal 100 may be provided with a bent section 125, 135. Such bent section 125, 135 can form a free end of the seal 100 and can be arranged to contact the cabin floor 10 when the aircraft door 20 is in a closed position.

The free end of the seal 100 can be adapted and shaped to correspond to the cabin floor 10 and/or any component arranged in the gap 22, 24, 26. For instance, the flat section 110 is provided with a bottom free end having a Z-shape, which may correspond to a Z-shaped door sill, cabin floor 10, component 42, etc. The flat section 120 may be provided with a bent section 125 to facilitate contact with the cabin floor 10 and/or a door sill (not illustrated) continuously along the longitudinal direction of this part of the seal 100. Next to the flat section 120 is provided a further flat section 130, wherein along the longitudinal direction of the seal 100 a portion of the bottom free end is straight while another portion of the bottom free end is provided with a bent section 135. This form of the free end of the flat section 130 may also be adapted to a correspondingly shaped opening or recess in the cabin floor 10 or door sill. Specifically, the flat sections 110, 120, 130 may contact the cabin floor 10 and/or door sill or the like at the front end of the free end and/or at the side of the flat section 110, 120, 130. The flat section 130 may extend from the other flat section 120.

The bent sections 125, 135 do not only contact the cabin floor 10 and/or door sill when the aircraft door 20 is in the closed position, but further facilitates moving the seal 100 on the cabin floor 10 and/or door sill during a closing movement of the aircraft door 20. The bent sections 125, 135 particularly close any uneven portions of the cabin floor 10 and/or door sill and further provide a tolerance of the seal 100 with respect to the cabin floor 10 and/or door sill and the final position of the aircraft door 20 when in its closed position.

In order to increase flexibility of the seal 100, it can be provided with one or more slits 118, 138. For example, slit 118 can be provided in a corner of the seal 100, i.e., between flat section 110 and flat section 130 (and/or flat section 120). Such corner slit 118 increases flexibility of the free end of the seal 100, particularly when slit 118 extends to the free end of the seal 100, i.e., it subdivides the seal 100 in a longitudinal direction, which has a bend here. Thus, the associated sections 110, 130 of seal 100 can adapt better to the surrounding, such as the cabin floor 10 and/or door sill and/or a recess, particularly during the closing movement of the aircraft door 20.

Another exemplary slit 138 is provided in flat section 130, wherein both ends of (the vertical) slit 138 are disposed with in flat section 130 (and/or flat section 120). Thus, slit 138 forms a through hole through seal 100. Such through-hole allows protruding of any component (not illustrated in FIG. 2) through seal 100, such as indicator and/or handle 42 of the emergency escape slide. This protrusion particularly takes place while the seal 100 moves in a direction substantially perpendicular to the flat section 130 of the seal 100. This movement may be induced by the movement of the aircraft door 20 while closing. The seal 100 having slit 138 allows at least partly sealing a circumference of the indicator or handle 42 or other component protruding through seal 100.

It is to be understood that, instead of being straight and having only two ends, the slit 138 may have one or more branches, two of which are illustrated in FIG. 2. This allows forming flaps of the seal 100, which better adapt to a protruding element. This facilitates sealing of the protruding element.

Figure 3:
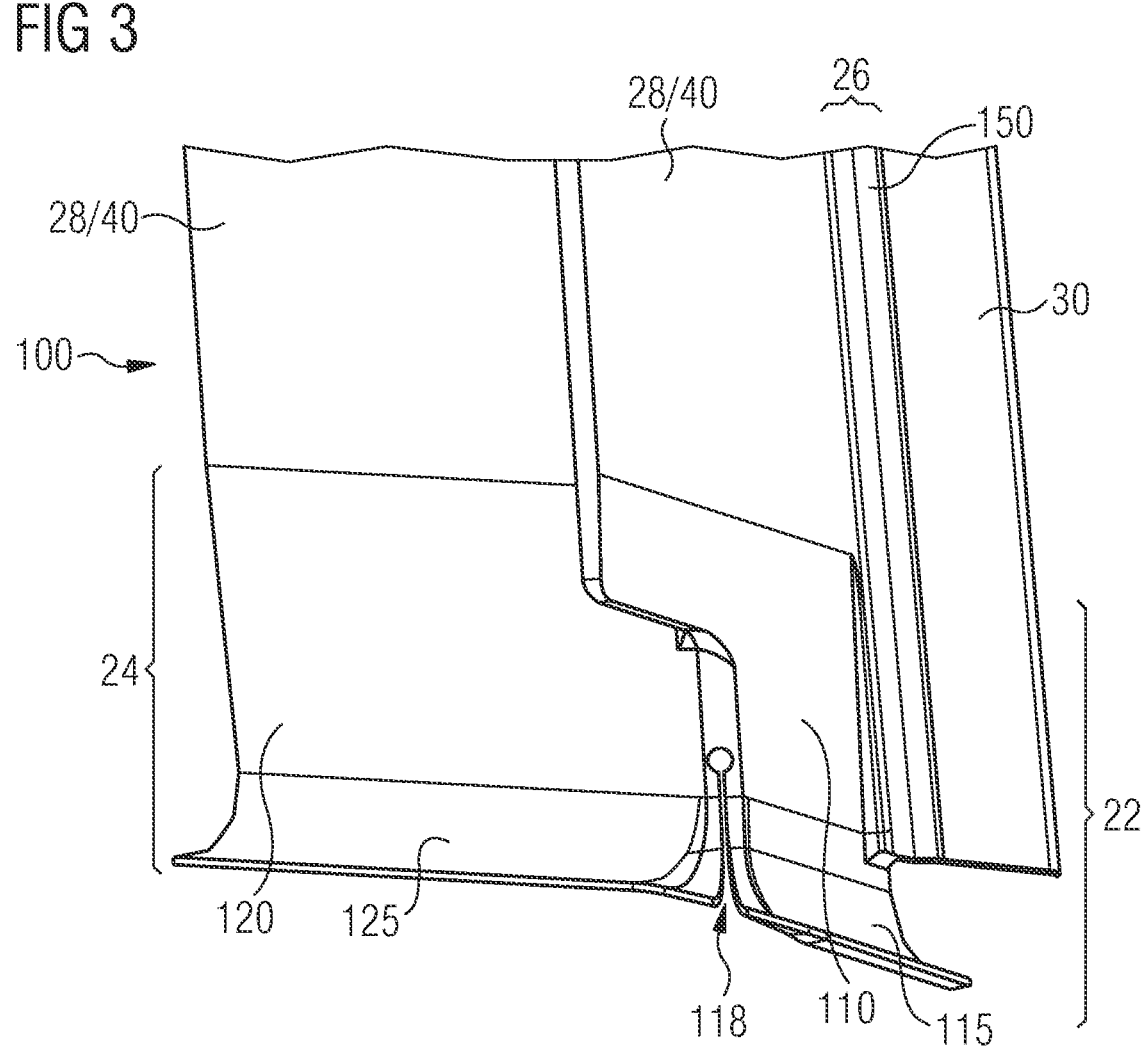

FIG. 3 illustrates another exemplary seal 100, that can also be employed in a corner 22 of aircraft door 20. FIG. 3 shows the seal 100 from an interior of the aircraft cabin looking towards the door 20 and exterior of the aircraft 1. The seal 100 of FIG. 3 is quite similar to the seal 100 of FIG. 2, but has a simpler shape. Specifically, seal 100 of FIG. 3 has a first flat section 110 and a second flat section 120, that are arranged at an angle to one another. A slit 118 is provided at least in a portion of the contacting edge of first and second flat sections 110, 120, in order to improve flexibility of the seal 100. Each of the first and second flat portions 110, 120 has a respective bent section 115, 125 that extends in this example over the entire longitudinal extension of first and second flat sections 110, 120. The slit 118 also subdivides the bent sections 115, 125.

The seal 100 of FIG. 3 is further adapted to contact wall lining 30, in order to close at least a portion of the gap 26 between aircraft door 20 and wall lining 30. This may include a further flat section 150 of the seal 100, which extends to a side of the door 20 and away from the bottom free end 115 of the seal 100 towards wall lining 30. Flat section 150 may overlap with wall lining 30 or simply contact wall lining 30 with its front end. In addition, the seal 100 is also configured to be mounted to or be integrated into a bottom region of the door lining 28 and/or slide cover 40.

Figure 4:
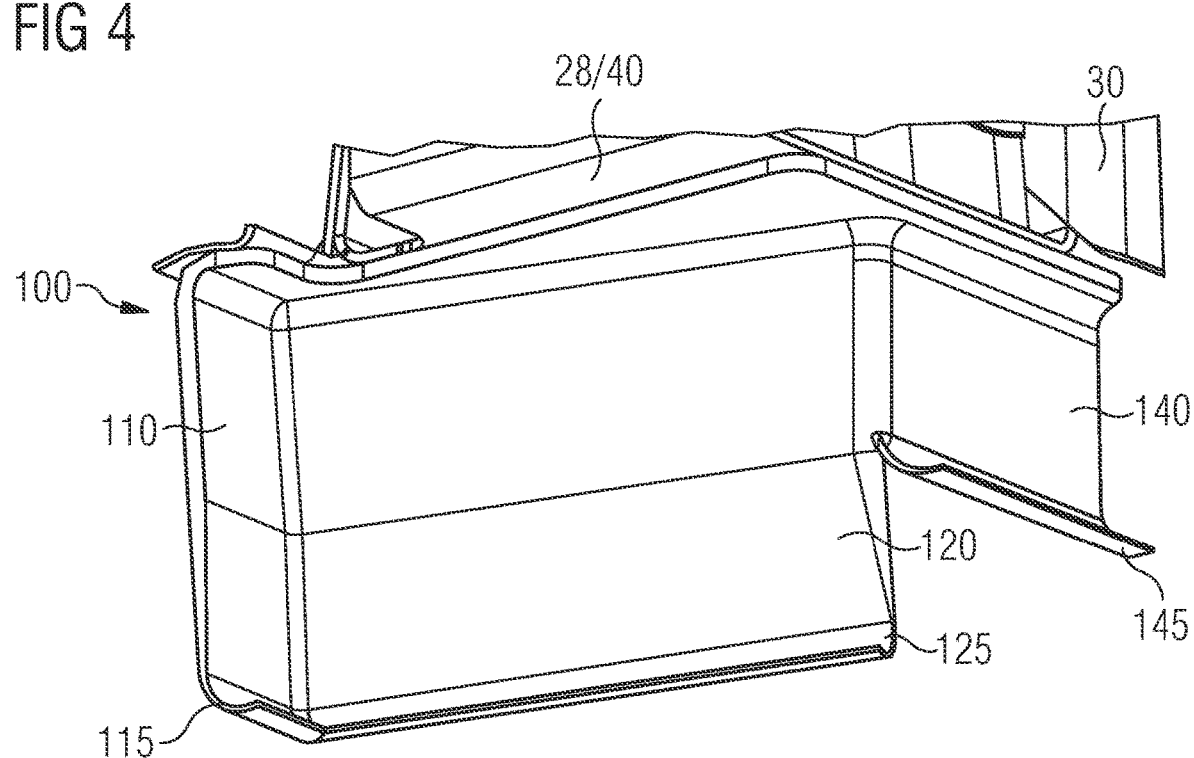

FIG. 4 illustrates a further variant of a corner seal 100, wherein the viewing direction of the drawing is from an interior of the aircraft cabin towards the door 20 and the exterior of the aircraft 1. This exemplary seal 100 is provided with three flat sections 110, 120, 140, wherein to outer flat sections 110, 140 are arranged at an angle with respect to the inner flat section 120. In other words, the longitudinal direction of the seal 100 may have a Z-shape when viewed in a plan view. The outer flat section 140 of exemplary seal 100 of FIG. 4 is shorter in a direction towards the bottom free end of the seal 100 then the other flat sections 110, 120. This allows sealing a recess (not illustrated) in the cabin floor 10 and/or door sill by flat sections 110, 120. In addition, each of the flat sections 110, 120, 140 is provided with a respective bent section 115, 125, 145 at a free end thereof, in order to facilitate proper sealing of the gap 22, 24, 26 by seal 100 during and after closing movement of the aircraft door 20.

FIG. 5 illustrates a further variant of a seal 200, that can be mounted to and/or be integrated into a slide cover 40 covering an emergency escape slide (not illustrated) attached to the aircraft door 20. The seal 200 is arranged in gap 24 between aircraft door 20 and cabin floor 10. The seal 200 comprises a loop section 210 that forms a free end of the seal 200. Such loop section 210 has a closed circular cross section at the free end of the seal 200. Of course, the closed cross-sectional shape at the free end of the seal 200 may have any round form, including an ellipse, polygon or the like. The loop section 210 provides elasticity to the seal 200, but is stiffer than bent sections 115, 125, 135, 145 of the exemplary seals 100 of FIGS. 2 to 4. This can be advantageous, since the seal 200 of slide cover 40 may glide over a larger area of the cabin floor 10 during closing movement of aircraft door 20.

The seal 200 can also be provided with a combination of a loop section 210 and a bent section (not illustrated in FIG. 5). This may easily be achieved by removing a portion of the loop section 210, so that the remainder thereof forms a bent section, such as bent sections 115, 125, 135, 145 of the exemplary seals 100 of FIGS. 2 to 4.

The seal 200 can also be provided with one or more slits 220. Specifically, FIG. 5 illustrates a plurality of slits 220 arranged parallel to a cross-sectional plane of the seal 200. In other words, the slits 220 subdivide at least a portion of the seal 200 along its longitudinal direction. This facilitates elasticity of the seal 200 in the longitudinal direction of the seal 200, while maintaining the sealing capabilities. Such slits 220 can advantageously be provided in a region of the seal 200 that is arranged at an angle or substantially perpendicular to the door leaf of the aircraft door 20, since this portion of the seal 200 moves over the cabin floor 10 in substantially the longitudinal direction of the seal 200. The seal 200 can then adapt to any obstacles or uneven portions of the cabin floor 10 easily.

FIG. 6 schematically illustrates variants of the seal 200. For instance, as illustrated in the left part of this drawing the loop section 210 may have a symmetric cross-section, so that its cross-section has the shape of a droplet. Compared to the asymmetric cross-section of seal 200 illustrated in FIG. 5, the symmetric loop section 210 allows flexibility in both directions parallel to the cross-sectional direction (Y axis in FIG. 6) and perpendicular to the longitudinal direction (X axis in FIG. 6). For instance, this allows flexible movement (bending) of the seal 200 during closing as well as opening of the aircraft door 20.

Furthermore, FIG. 6 also schematically illustrates in the right part of this drawing a further variant of the seal 200 having a rather rectangular cross-sectional shape. The seal 200 can be of full material or can be a tube-like seal 200 having an empty interior space.

This variant of the seal 200 is further provided with a slit 225 arranged parallel to a longitudinal direction of the seal 200 (X axis). The slit 225 extends in a direction perpendicular to the drawing plane of FIG. 6. This provides flexibility of the seal 200 in a direction parallel to the cross-sectional plane (Z and Y axis), while the sealing capability along the longitudinal direction (X axis) is fully maintained.

It is to be understood that the seal 100, 200 may also be provided with one or more slits arranged parallel to a cross-sectional plane of the seal 100, 200 and also one or more slits arranged parallel to a longitudinal direction of the seal 100, 200. In other words, the seal 100, 200 may be provided with both, slits 220 (FIG. 5) and one or more slits 225 (FIG. 6). Such slits 220, 225 lead to a comb or brush like seal 100, 200 that provides significant flexibility in all directions.

The above examples and variants are solely provided for explanation of the invention. All examples, variants and particular details thereof can be combined with one another, in order to achieve particular embodiments of the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cabin section, comprising:
an aircraft door;
a cabin floor;
at least one lining mounted to the aircraft door; and
an emergency escape slide attached to the aircraft door,
wherein at least one seal is mounted to the at least one lining which seals a space between the at least one lining and the cabin floor,
wherein the at least one seal comprises at least one flat section that is arranged substantially perpendicular to the cabin floor and which spans between a bottom edge of lining and cabin floor,
wherein the at least one seal is mounted to or integrated into the bottom edge of the lining, and
wherein the emergency escape slide includes at least one of an indicator and a handle which protrudes through a slit in the at least one seal.

2. The aircraft cabin section according to claim 1, wherein the at least one seal is configured to elastically deform when contacting the cabin floor and in response to a movement of the aircraft door relative to the cabin floor.

3. The aircraft cabin section according to claim 1, wherein the at least one seal comprises a bent section that forms a free end of the seal arranged to contact the cabin floor, when the aircraft door is in a closed position.

4. The aircraft cabin section according to claim 1, wherein the at least one seal comprises a loop section that forms a free end of the seal arranged to contact the cabin floor, when the aircraft door is in a closed position.

5. The aircraft cabin section according to claim 1, wherein the at least one seal has at least one slit.

6. The aircraft cabin section according to claim 5, wherein the at least one slit is arranged at least one of parallel to a cross-sectional plane of the at least one seal or parallel to a longitudinal direction of the at least one seal.

7. The aircraft cabin section according to claim 1, wherein the at least one lining is a slide cover covering the emergency escape slide.

8. The aircraft cabin section according to claim 7, wherein the at least one seal is configured to allow protruding of an indicator or handle of the emergency escape slide through the at least one seal and to seal at least part of a circumference of the indicator or handle.

9. The aircraft cabin section according to claim 1, wherein the at least one seal is made of an elastic material.

10. The aircraft cabin section according to claim 9, wherein the at least one seal is made of rubber or silicone.

11. An aircraft having at least one aircraft cabin section according to claim 1.

12. The aircraft cabin section according to claim 1, wherein the at least one lining is a door lining.

13. An aircraft cabin section, comprising:
an aircraft door;
a cabin floor; and
at least one lining mounted to the aircraft door,
wherein at least one seal is mounted to the at least one lining which seals a space between the at least one lining and the cabin floor, wherein the at least one lining is a slide cover covering an emergency escape slide attached to the aircraft door, and wherein the emergency escape slide includes at least one of an indicator and a handle which protrudes through a slit in the at least one seal, and wherein the slit has one or more branches and seals at least part of a circumference of the indicator or handle.

14. The aircraft cabin section according to claim 13, wherein the at least one seal is configured to elastically deform when contacting the cabin floor and in response to a movement of the aircraft door relative to the cabin floor.

15. The aircraft cabin section according to claim 13, wherein the at least one seal comprises a loop section that forms a free end of the seal arranged to contact the cabin floor, when the aircraft door is in a closed position.

16. The aircraft cabin section according to claim 13, wherein the at least one seal is made of an elastic material.

17. The aircraft cabin section according to claim 16, wherein the at least one seal is made of rubber or silicone.

18. An aircraft cabin section, comprising:
an aircraft door;
a cabin floor;
at least one lining mounted to the aircraft door; and
an emergency escape slide attached to the aircraft door, wherein at least one seal is mounted to the at least one lining which seals a space between the at least one lining and the cabin floor, wherein the at least one seal comprises a bent section followed by a loop section, such that the loop section forms a free end of the seal arranged to contact the cabin floor, when the aircraft door is in a closed position, wherein the bent section covers a portion of the space between the at least one lining and the cabin floor, and wherein the emergency escape slide includes at least one of an indicator and a handle which protrudes through a slit in the at least one seal.

19. The aircraft cabin section according to claim 18, wherein the at least one slit is arranged at least one of parallel to a cross-sectional plane of the at least one seal or parallel to a longitudinal direction of the at least one seal.

* * * * *